United States Patent Office 3,110,213
Patented Nov. 12, 1963

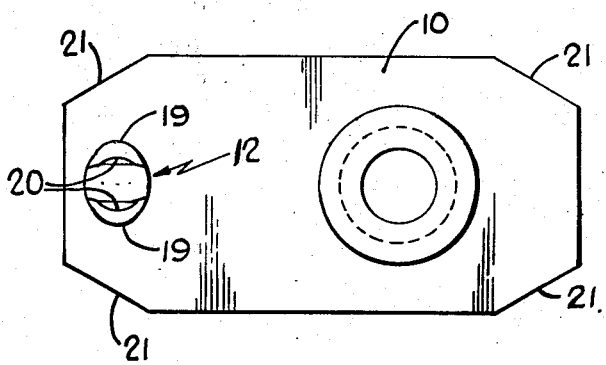
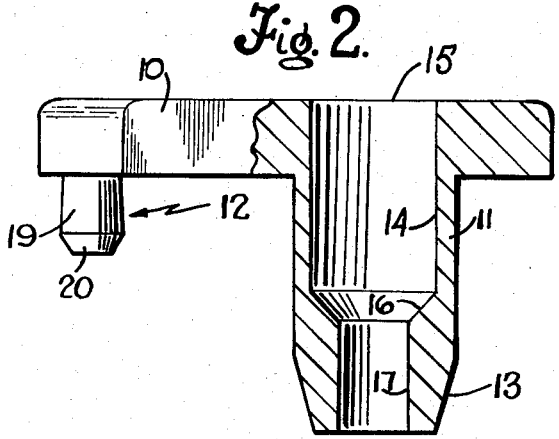
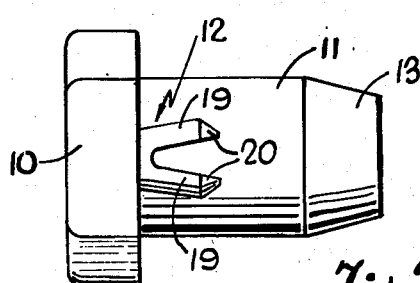

3,110,213
COLLAPSIBLE SCREW FASTENING MEANS HAVING AUXILIARY RESILIENT ROTATION PREVENTING MEANS
Aubrey Disley, Knowle, England, assignor to George Goodman Limited, Birmingham, England, a British company
Filed Feb. 10, 1961, Ser. No. 88,524
1 Claim. (Cl. 85—40)

This invention relates to a screw fastening device of the kind comprising a sleeve adapted to be mounted in a prepared hole in the member to which the device is to be applied, said sleeve having an enlarged head at one end and being so formed that when a screw is driven into the sleeve from this end, the wall of the sleeve which is on the side of said member remote from the head, is caused to bulge outwardly so that ultimately the sleeve is firmly anchored in the said member.

In one form this known kind of fastening device the sleeve made of metal has been cylindrical throughout and when being used the head is held by a tool whilst the screw is being driven to prevent rotation of the sleeve and to prevent the sleeve from being drawn out of the said member when the wall of the sleeve is being bulged.

In my copending United States application Serial No. 30,503, filed May 20, 1960, there is described an improved screw fastening device of this kind in which the sleeve has a portion of square cross-section immediately behind the head at one end of the sleeve and a number of radial projections adjacent this portion of square cross-section, the square cross-section portion being for the purpose of preventing rotation of the sleeve when it is engaged in a square hole in the plate, sheet, or other member with which the sleeve is used and the projections being adapted to engage behind the said member to prevent the sleeve being withdrawn when it is being deformed by the application of a screw.

While this arrangement is perfectly satisfactory in operation, it does require the provision of square holes in a metal sheet or plate and in certain cases the provision of square holes is not considered attractive compared with the use of circular holes because of the increased tool costs involved with the former as compared with the latter.

The object of the present invention is to provide an improved fastening device of the kind above referred to and one which will involve only the provision of circular holes in the member with which the fastening device is to be used.

According to the present invention I provide a fastening device of the kind referred to wherein the portion of the sleeve adjacent the enlarged head is of circular cross-section for fitting in a hole of corresponding shape in the member with which the fastening device is used, the enlarged head of the device being provided with a locating projection extending parallel to the axis of the sleeve and spaced therefrom, said locating projection having a cross-section such as to enable it to be engaged in a circular hole provided in the said member.

One of the functions of such locating projection is to prevent rotation of the sleeve about its axis when the screw is being inserted and in accordance with a further aspect of the invention the locating projection may be adapted to provide an additional function and may be so formed that it can be forcibly engaged in the hole in said member and will exert sufficient grip therein when engaged, to prevent withdrawal of the sleeve from said member when it is being deformed by the application of a screw.

For example, the locating projection may be formed so as to provide two outwardly diverging resilient legs which can be forcibly closed together when the locating projection is engaged in a circular hole and will subsequently tend to return to their initial position thus exerting a strong frictional grip upon the sides of the hole in the sheet or plate.

It will be appreciated that projections to prevent withdrawal of the sleeve could be provided on the sleeve itself as described in the prior application aforesaid but with the present invention it is preferred to make use of the locating projection to also prevent withdrawal of the sleeve.

The invention is illustrated in the accompanying drawings wherein,
FIGURE 1 is an underneath plan view,
FIGURE 2 is a partly sectioned side view, and,
FIGURE 3 is an end view.

In the embodiment of the invention shown in the drawings the fastening device is made from a suitable plastics material such as nylon which enables the article to be economically produced by a die-casting operation and provides a sleeve wall which is readily bulged when a screw is applied. The enlarged head 10 of the device is of generally rectangular form in plan view with the sleeve 11 and locating projection 12 formed integrally therewith and projecting from one side thereof, the sleeve 11 being located near one end of the rectangular head and the locating projection 12 being disposed near the other end thereof.

The sleeve 11 is of generally cylindrical formation over the major portion of its length with its end 13 remote from the head 10, of tapering form to provide a lead-in when it is inserted into a prepared hole in the sheet or plate. Internally the sleeve has a portion 14 of enlarged diameter which extends from the outer face 15 of the enlarged head 10 axially inwards to a position about mid-way along the sleeve and there merging by means of a tapered shoulder 16 to a portion 17 of lesser diameter which extends through to the outer end 18 of the sleeve.

This portion 17 is preferably left plain on its interior so that the screw, when entering the sleeve, can cut its own thread in the wall of the portion of the sleeve. If desired, however, the portion 17 may be provided with an internal screw thread.

The locating projection 12 is of bifurcated form providing two legs 19 which diverge outwardly away from each other in the direction away from the enlarged head 10 and each leg has its free end tapered to provide a chamfered lead-in 20 so that when the fastening device is applied to a sheet or plate, the sleeve 11 is first engaged in a prepared hole and pushed inwardly until the locating projection 12 comes into register with a further prepared hole whereupon further axial movement brings the free ends of the legs 19 of the locating projection into engagement with the hole causing the legs 19 to be deflected inwardly towards one another so as to enable the locating projection to be pushed right home whereupon the legs 19, due to the inherent resilience of the material, tend to spring apart and will exert a frictional force in the hole in the sheet or plate sufficient to prevent withdrawal of the sleeve 11 when a screw is being applied in the normal way to cause distortion and bulging of the sleeve to lock the fastening device firmly in position.

The approximately rectangular head 10, which is relatively large as compared with the locating projection 12 and the sleeve 11, also provides an effective seal when it is tightly clamped against a metal sheet or plate to prevent the ingress of foreign matter or moisture.

As shown in FIGURE 1, for some applications the corners of the head 10 may be cut off as shown at 21. This provides a form of lead-in at each end of the head and is useful in a case such as where a television chassis has been assembled with these fastening devices and is then inserted in a cabinet with the heads 10 engaging in runners in the cabinet.

What I claim then is:

A fastening device formed of synthetic resinous material having a head of flat rectangular form with a flat face to engage the member in which the device is mounted, a sleeve formed integrally near one end of said head, said sleeve being of circular cross-section, projecting from said flat face with its axis at right angles to said face, said sleeve consisting of two portions, a first portion adjacent said head being a thin-walled collapsible section adaped to bulge outwardly on the rear side of said member, and a second portion axially remote from said head extending from said first portion to the terminus of said sleeve, said second portion being a thick-walled section adapted to be interiorly engaged by the threads of a screw whereby a compressive force is introduced into said thin-walled section and said thin-walled section is axially collapsed, said sleeve having an axial bore of circular cross-section extending through the head to the free end of the sleeve, the diameter of said bore in said thin-walled section between the head and said second portion of the sleeve remote from the head being greater than the diameter of the bore in said second portion, and a locating projection formed integrally with the head near the other end thereof and projecting from said flat face with its axis at right angles to the face, said locating projection comprising a pair of resilient legs diverging outwardly of the axis of the projection in the direction away from the head, said legs being capable of being forcibly closed together when the locating projection is engaged in a circular hole in said member and will subsequently tend to return to their initial position the extremity of each leg being tapered to provide a chamfered lead-in portion.

References Cited in the file of this patent

UNITED STATES PATENTS

| | | |
|---|---|---|
| 1,881,973 | Schmitt | Oct. 11, 1932 |
| 2,123,081 | Sadenwater | July 5, 1938 |
| 2,150,080 | Rawlings | Mar. 7, 1939 |
| 2,468,333 | Johnson | Apr. 26, 1949 |
| 2,596,332 | Flora et al. | May 13, 1952 |
| 2,763,314 | Gill | Sept. 18, 1956 |
| 2,788,047 | Rapata | Apr. 9, 1957 |
| 3,014,563 | Bratton | Dec. 26, 1961 |
| 3,030,705 | Gill | Apr. 24, 1962 |

FOREIGN PATENTS

| | | |
|---|---|---|
| 658,776 | Great Britain | Oct. 10, 1951 |